Jan. 26, 1937.  W. R. FREEMAN  2,068,948
CLUTCH CONTROL
Filed March 12, 1932
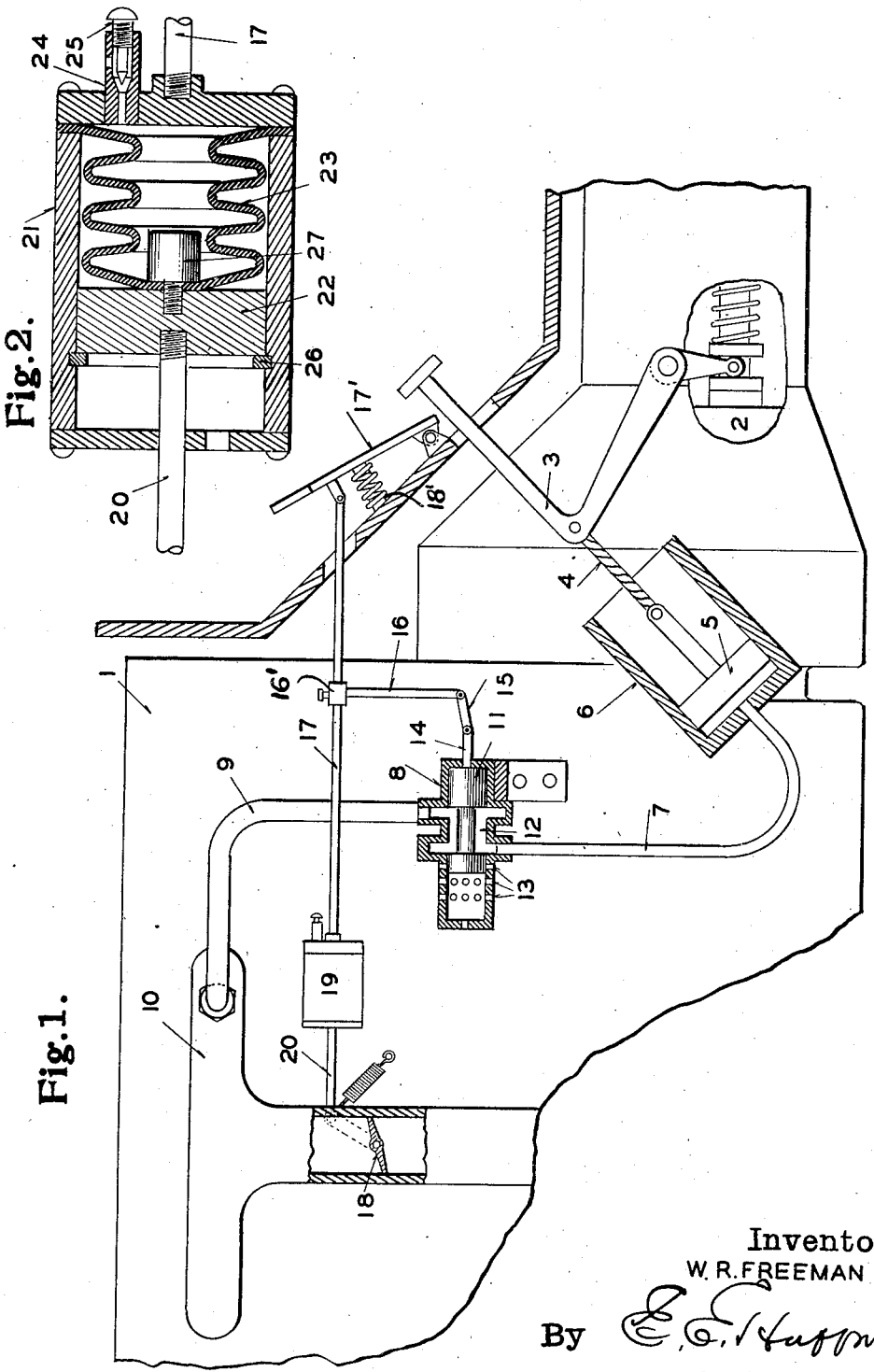
Inventor
W. R. FREEMAN
By E. E. Huffman
Att'y.

Patented Jan. 26, 1937

2,068,948

UNITED STATES PATENT OFFICE 2,068,948

CLUTCH CONTROL

Walter R. Freeman, Jay, Okla., assignor to Bragg-Kliesrath Corporation, South Bend, Ind., a corporation of New York Application March 12, 1932, Serial No. 598,375

2 Claims. (Cl. 192—.01)

My invention relates to power-operated clutches for motor vehicles and especially to power-operated clutches which are controlled by the mechanism for controlling the speed of the vehicle.

In power-operated clutches of the type referred to, the valve for controlling the power means for the clutch is so connected to the accelerator mechanism of the engine that the power means moves the clutch to disengaged position when the accelerator means is in its "off" position and allows the clutch to reengage when the accelerator mechanism is actuated to increase the speed of the engine. The accelerator mechanism is generally provided with a free lost motion connection between the accelerator pedal and the throttle valve so that the valve for the power means may be so operated as to allow the clutch to be reengaged before the speed of the engine is increased. This free lost motion connection has been found to have disadvantages, as for example, when coasting down an incline at a fair rate of speed with the throttle closed and the clutch disengaged, it is desired to reengage the clutch and accelerate the vehicle. When the accelerator mechanism is operated, the clutch will be engaged prior to the speeding up of the engine, thereby resulting in a slipping of the clutch and a heavy strain on the transmission gears and transmission shaft joints as the engine is picked up by the rotating parts of the moving vehicle. It is, therefore, the principal object of my invention to devise a form of lost motion connection for the accelerator mechanism of the vehicle which will retain all the advantages of the prior free lost motion connection and may be so operated by the vehicle operator that the speed of the engine and, therefore, the speed of the clutch element connected thereto, can be controlled to approximate, at the time of engagement, the speed of the cooperating clutch element connected to the wheels of the vehicle, thereby eliminating slippage of the clutch and strains on the transmission train.

Other objects will become apparent from the following description of an embodiment of my invention taken in connection with the accompanying drawing in which Figure 1 is a side elevation, partly in section, of a portion of a motor vehicle showing my invention associated with power-operated clutch control mechanism; and Figure 2 is an enlarged cross sectional view of one suitable form of lost motion means in the connection between the throttle valve and the accelerator pedal whereby the object of my invention may be achieved.

Referring to the drawing in detail, I indicates the outline of the engine of the motor vehicle which is connected by means of the clutch 2 to the transmission and road wheels. The clutch pedal 3 extends through the floor board for actuation by the operator of the vehicle and has connected to it, by a flexible member 4, the movable piston 5 of the suction motor 6, the cylinder of which is secured to a suitable support. The closed end of the motor 6 is connected by a conduit 7 with a valve casing 8 suitably supported from the engine, the valve casing being in communication, by means of a conduit 9, with the manifold 10 of the engine. The cylindrical valve member 11, which is slidable in the valve casing 8, is provided with a cylindrical groove 12 of such width that the conduits 7 and 9 will be in communication with each other when the valve is in the position shown, thus permitting the suction motor to operate to disengage the clutch. One end of the valve casing 8 is provided with a plurality of discharge orifices 13, the position of which is such that when the valve member 11 is moved to the left a sufficient distance to cut off the opening of conduit 9, they will be in communication with conduit 7 by means of the groove 12 so as to admit air to the suction motor to allow reengagement of the clutch.

The valve member 11 has secured thereto a rod 14 which is connected by means of a link 15 with an arm 16, the latter being adjustably connected at 16' to an accelerator pedal actuated rod 17 controlled by the accelerator pedal 17'. The pedal 17' is maintained in its off position by a spring 18'. The rod 17 is connected to control a spring closed throttle valve 18 in the manifold 10 by means of my novel lost motion connection 19 and a rod 20.

In accordance with my invention the accelerator pedal rod 17 is provided with a cylinder member 21 which is adapted to receive a piston 22 connected to the throttle valve rod 20. In order to insure against leakage of any air between the piston and the cylinder, I have connected the head of the piston with the head of the cylinder by means of a cylindrical, corrugated diaphragm 23 made of a light substance such as thin rubber, in that it may offer substantially no resistance to the movement of the piston toward the head of the cylinder. The chamber in the cylinder defined by the diaphragm, is vented to the atmosphere by a suitable short pipe 24, the external orifice of which is adapted to be varied by means of a screw valve 25.

A stop ring 26 limits the movement of the piston toward the left, and an extension or stop 27, carried by the head of the piston, limits the movement of the piston toward the head of the cylinder. The distance between the extension 27 and the head of the cylinder, when the piston is abutting the stop ring as shown in Figure 2, is approximately equal to the distance the valve member 11 must travel to cut off communication between conduits 7 and 9.

If the vehicle is not moving but the engine is running with the throttle mechanism in its off position, the clutch will be disengaged since (as shown in Figure 1) valve member 11 allows communication between the conduits 7 and 9. If it is now desired to start the vehicle, the proper gear of the transmission will be first engaged and then the accelerator pedal gradually depressed. This slow movement of the accelerator rod 17 causes the air contained in the diaphragm 23 to be forced out through the venting pipe 24 as the throttle valve spring is strong enough to maintain the piston 22 stationary until the head of the cylinder abuts the stop 27 on the piston to open the throttle valve, thus allowing valve 11 to close conduit 9 and place conduit 7 in communication with the atmosphere to engage the clutch by the time the throttle valve begins to open. Since the engine is rotating at a very low speed when the clutch elements are engaged, there will be little or no slipping of the clutch as the vehicle is started.

If the vehicle is traveling at a fair rate of speed and the throttle valve is in "closed" position and the clutch is disengaged, and the operator desires to engage the clutch and have the engine transmit power to the vehicle wheels, he may depress the accelerator pedal rapidly, which quick movement will cause the throttle valve to be immediately actuated to speed up the engine since the air contained in the diaphragm cannot escape through the vent rapidly enough to allow the throttle to remain stationary until the piston stop 27 engages the head of the cylinder. It is thus seen that by the time the valve member 11 cuts off conduit 9 and places conduit 7 in communication with the atmosphere to allow the clutch to engage, the engine will have been speeded up so that both clutch elements will be rotating at more nearly the same speed when engaged, than if no movement were communicated to the throttle until after valve 11 released the suction motor.

The rate of escape of air from the diaphragm, can be adjusted by the valve screw 25.

From the foregoing description of my invention it is seen that the operator can readily control the speed of the engine to cause it to substantially conform with the speed of the vehicle at the time the automatic clutch operating mechanism allows the clutch to engage.

Having fully described my invention, what I claim as new and desire to secure by Letters Patent of the United States is:

1. The combination with a motor vehicle having an engine, a throttle valve for said engine, a throttle valve actuating mechanism and a clutch, power means including a valve for disengaging the clutch, said power means and valve being controlled by said actuating mechanism and the clutch being disengaged when said actuating mechanism is in off position, means connecting the actuating mechanism and the throttle valve and comprising a pair of relatively movable members, and means for controlling the relative movement of said members comprising a ported cylinder connected to one of said members, a piston connected to the other of said members, and a diaphragm member interconnecting said piston and cylinder.

2. The combination with a motor vehicle having an engine, a throttle valve for said engine, a throttle valve actuating mechanism and a clutch, power means including a valve for disengaging the clutch, said power means and valve being controlled by said actuating mechanism and the clutch being disengaged when said actuating mechanism is in off position, means connecting the actuating mechanism and the throttle valve and comprising a pair of relatively movable members, and means for controlling the relative movement of said members comprising a ported cylinder connected to one of said members, a piston connected to the other of said members, a diaphragm member interconnecting said piston and cylinder, and means for adjusting the size of the port of said cylinder member.

WALTER R. FREEMAN.